United States Patent
Bohannon et al.

(10) Patent No.: US 10,601,947 B2
(45) Date of Patent: Mar. 24, 2020

(54) APPLICATION SERVICE DELIVERY THROUGH AN APPLICATION SERVICE AVATAR

(71) Applicant: Facebook, Inc., Menlo Park, CA (US)

(72) Inventors: Philip Lewis Bohannon, Cupertino, CA (US); Viswanath Poosala, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/238,183

(22) Filed: Jan. 2, 2019

(65) Prior Publication Data

US 2019/0141162 A1    May 9, 2019

Related U.S. Application Data

(63) Continuation of application No. 14/584,815, filed on Dec. 29, 2014, now Pat. No. 10,205,797.

(51) Int. Cl.
*H04L 29/08* (2006.01)
(52) U.S. Cl.
CPC ........ *H04L 67/2861* (2013.01); *H04L 67/289* (2013.01); *H04L 67/306* (2013.01)
(58) Field of Classification Search
CPC .. H04L 67/2861; H04L 67/289; H04L 67/306
See application file for complete search history.

(56) References Cited

U.S. PATENT DOCUMENTS

| 5,864,837 A | 1/1999 | Maimone |
| 6,941,338 B1 | 9/2005 | Madsen |
| 6,957,212 B2 | 10/2005 | Peng |

(Continued)

FOREIGN PATENT DOCUMENTS

| AU | 2014415653 A1 | 7/2017 |
| BR | 11 2017 013902 A2 | 1/2018 |

(Continued)

OTHER PUBLICATIONS

Wathsala et al., "Next Generation Proxy Servers", Advanced Communication Technology, ICACT, Feb. 17-20, 2008, pp. 2183-2186.

(Continued)

*Primary Examiner* — Gil H. Lee
(74) *Attorney, Agent, or Firm* — FisherBroyles, LLP

(57) ABSTRACT

Some embodiments include a method of operating an avatar server. The method can include implementing an application service avatar in an avatar server that has at least an intermittent network access to an application service server for providing an application service to client applications. The avatar server can establish a service group by maintaining profiles of one or more end-user devices connected to the avatar server to access the application service. The avatar server can provide a localized application service by emulating at least a subset of functionalities provided by the application service to the end-user devices, for example, by locally processing, at least partially, a service request from at least one of the end-user devices at the avatar server. The avatar server can asynchronously communicate with the application service server to complete the service request.

20 Claims, 6 Drawing Sheets

(56) References Cited

U.S. PATENT DOCUMENTS

| | | |
|---|---|---|
| 7,069,328 B1 | 6/2006 | Bell |
| 7,099,927 B2 | 8/2006 | Cudd et al. |
| 7,359,933 B1 | 4/2008 | Polen et al. |
| 7,574,481 B2 | 8/2009 | Moore et al. |
| 7,743,022 B2 | 6/2010 | Kaasten et al. |
| 7,865,463 B2 | 1/2011 | Sollicito et al. |
| 8,255,921 B2 | 8/2012 | Arvidsson et al. |
| 8,279,780 B2 | 10/2012 | Yamamoto |
| 8,316,098 B2 | 11/2012 | Luna et al. |
| 8,601,090 B1 | 12/2013 | Richardson et al. |
| 8,788,475 B2 | 7/2014 | Fredricksen et al. |
| 8,812,651 B1 | 8/2014 | Eriksen et al. |
| 9,015,269 B1 | 4/2015 | Ruellan et al. |
| 9,055,124 B1 | 6/2015 | Hill |
| 9,189,510 B2 | 11/2015 | Song et al. |
| 9,229,740 B1 | 1/2016 | Allen et al. |
| 10,205,797 B2 * | 2/2019 | Bohannon ............ H04L 67/2861 |
| 2001/0030469 A1 | 10/2001 | Tsujikado et al. |
| 2002/0047861 A1 | 4/2002 | Labrie et al. |
| 2002/0087797 A1 | 7/2002 | Adrangi |
| 2002/0160773 A1 | 10/2002 | Gresham et al. |
| 2002/0178330 A1 | 11/2002 | Schlowsky-Fischer et al. |
| 2003/0063770 A1 | 4/2003 | Svendsen et al. |
| 2003/0084091 A1 | 5/2003 | Agarwalla et al. |
| 2003/0101267 A1 | 5/2003 | Thompson et al. |
| 2004/0128346 A1 | 7/2004 | Melamed et al. |
| 2004/0167967 A1 * | 8/2004 | Bastian ............ B64D 11/0015 709/206 |
| 2005/0102300 A1 | 5/2005 | Madsen |
| 2005/0188304 A1 | 8/2005 | Lawton et al. |
| 2005/0234864 A1 | 10/2005 | Shapiro |
| 2006/0010225 A1 | 1/2006 | Issa |
| 2006/0167979 A1 | 7/2006 | Fuchs et al. |
| 2007/0010245 A1 * | 1/2007 | Levitan ............ G06Q 30/04 455/426.1 |
| 2008/0005195 A1 | 1/2008 | Li |
| 2009/0100268 A1 * | 4/2009 | Garcia ............ G06F 21/6209 713/184 |
| 2009/0125391 A1 | 5/2009 | Toutonghi |
| 2009/0132640 A1 | 5/2009 | Verma et al. |
| 2009/0168795 A1 | 7/2009 | Segel |
| 2009/0327412 A1 | 12/2009 | Lepeska |
| 2010/0007713 A1 | 1/2010 | Yamamoto |
| 2010/0122217 A1 | 5/2010 | Yen |
| 2010/0229221 A1 | 9/2010 | Tam et al. |
| 2010/0333131 A1 | 12/2010 | Parker et al. |
| 2011/0035503 A1 | 2/2011 | Zaid et al. |
| 2011/0276535 A1 * | 11/2011 | Pin ............ G06Q 10/10 707/608 |
| 2011/0314085 A1 | 12/2011 | Koronthaly et al. |
| 2012/0158973 A1 | 6/2012 | Jacobson et al. |
| 2012/0166436 A1 | 6/2012 | Kalasapur et al. |
| 2012/0198075 A1 | 8/2012 | Crowe et al. |
| 2012/0290436 A1 | 11/2012 | Frost et al. |
| 2013/0007205 A1 | 1/2013 | Humphreys et al. |
| 2013/0073609 A1 | 3/2013 | Connolly et al. |
| 2013/0073622 A1 | 3/2013 | Nguyen et al. |
| 2013/0080895 A1 | 3/2013 | Rossman et al. |
| 2013/0097236 A1 | 4/2013 | Khorashadi et al. |
| 2013/0138763 A1 | 5/2013 | Panzer et al. |
| 2013/0219006 A1 | 8/2013 | Kuo |
| 2014/0040412 A1 | 2/2014 | Yanagihara et al. |
| 2014/0064095 A1 | 3/2014 | Li et al. |
| 2014/0075307 A1 | 3/2014 | Bargas et al. |
| 2014/0143647 A1 | 5/2014 | Reshadi et al. |
| 2014/0173230 A1 | 6/2014 | Smith et al. |
| 2014/0181040 A1 | 6/2014 | Montulli et al. |
| 2014/0280515 A1 | 9/2014 | Wei et al. |
| 2014/0344437 A1 * | 11/2014 | Huang ............ H04L 67/2814 709/223 |
| 2015/0004949 A1 | 1/2015 | Fienberg et al. |
| 2015/0169701 A1 | 6/2015 | Stekkelpak et al. |
| 2015/0201033 A1 | 7/2015 | Gupta |
| 2016/0028830 A1 | 1/2016 | Coglitore et al. |
| 2016/0028846 A1 | 1/2016 | Coglitore et al. |
| 2016/0191673 A1 | 6/2016 | Bohannon et al. |
| 2019/0222665 A1 | 7/2019 | Coglitore et al. |

FOREIGN PATENT DOCUMENTS

| | | |
|---|---|---|
| CA | 2 971 154 A1 | 7/2016 |
| CN | 107251086 A | 10/2017 |
| EP | 3 040 931 A1 | 7/2016 |
| JP | 2001-051839 A | 2/2001 |
| JP | 2003-008664 A | 1/2003 |
| JP | 2003-228520 A | 8/2003 |
| JP | 2013-510356 A | 3/2013 |
| JP | 2018-509672 A | 4/2018 |
| KR | 10-2017-0102289 A | 9/2017 |
| MX | 2017008740 A | 11/2017 |
| WO | 2010/106832 A1 | 9/2010 |
| WO | 2011/054912 A1 | 5/2011 |
| WO | 2016/108828 A1 | 7/2016 |

OTHER PUBLICATIONS

Peck, Michael, "That Drone Is a Wi-Fi Hotspot", URL: https://warisboring.com/that-drone-is-a-wi-fi-hotspot/, Apr. 8, 2014, pp. 1-3.

Non-Final Office Action received for U.S. Appl. No. 14/584,815 dated Aug. 14, 2017, 44 pages.

Non-Final Office Action received for U.S. Appl. No. 14/584,815 dated Jun. 15, 2018, 36 pages.

Notice of Allowance received for U.S. Appl. No. 14/584,815 dated Sep. 25, 2018, 28 pages.

Non-Final Office Action received for U.S. Appl. No. 14/152,166 dated Feb. 12, 2016, 32 pages.

Final Office Action received for U.S. Appl. No. 14/152,166 dated Jul. 22, 2016, 23 pages.

Non-Final Office Action received for U.S. Appl. No. 14/152,166 dated May 9, 2017, 24 pages.

Notice of Allowance received for U.S. Appl. No. 14/152,166 dated Nov. 15, 2017, 37 pages.

Non-Final Office Action received for U.S. Appl. No. 14/339,002 dated Jun. 23, 2016, 50 pages.

Final Office Action received for U.S. Appl. No. 14/339,002 dated Dec. 9, 2016, 51 pages.

Non-Final Office Action received for U.S. Appl. No. 14/339,002 dated May 26, 2017, 47 pages.

Final Office Action received for U.S. Appl. No. 14/339,002 dated Nov. 14, 2017, 65 pages.

Non-Final Office Action received for U.S. Appl. No. 14/339,002 dated May 15, 2018, 67 pages.

Final Office Action received for U.S. Appl. No. 14/339,002 dated Jan. 23, 2019, 76 pages.

Notice of Allowance received for U.S. Appl. No. 14/339,002 dated May 30, 2019, 55 pages.

Non-Final Office Action received for U.S. Appl. No. 14/338,994 dated Oct. 17, 2016, 50 pages.

Final Office Action received for U.S. Appl. No. 14/338,994 dated Mar. 23, 2017, 46 pages.

Non-Final Office Action received for U.S. Appl. No. 14/338,994 dated Sep. 11, 2017, 53 pages.

Final Office Action received for U.S. Appl. No. 14/338,994 dated Feb. 5, 2018, 51 pages.

Non-Final Office Action received for U.S. Appl. No. 14/338,994 dated Jun. 27, 2018, 56 pages.

Notice of Allowance received for U.S. Appl. No. 14/338,994 dated Jan. 8, 2019, 39 pages.

Notice of Allowability received for U.S. Appl. No. 14/152,166 dated Dec. 11, 2017, 8 pages.

Advisory Action received for U.S. Appl. No. 14/152,166 dated Oct. 5, 2016, 7 pages.

Advisory Action received for U.S. Appl. No. 14/339,002 dated Mar. 10, 2017, 10 pages.

Coglitore et al., "Residential Cache Appliance Utilizing a Social Network", U.S. Appl. No. 14/338,994 dated Jul. 23, 2014, 63 pages.

(56) References Cited

OTHER PUBLICATIONS

Bohannon et al., "Rural Area Network Device", U.S. Appl. No. 14/339,002 dated Jul. 23, 2014, 60 pages.
Gupta, Vishal, "Content Specific Router Caching", U.S. Appl. No. 14/152,166 dated Jan. 10, 2014, 41 pages.
Advisory Action received for U.S. Appl. No. 14/338,994 dated Aug. 3, 2017, 9 pages.
Bohannon et al., "Application Service Delivery Through an Application Service Avatar", U.S. Appl. No. 14/584,815 dated Dec. 29, 2014, 68 pages.
Gupta, Vikas, "Content Specific Router Caching", U.S. Appl. No. 15/900,579 dated Feb. 20, 2018, 39 pages.
Coglitore et al., "Residential Cache Appliance Utilizing a Social Network", U.S. Appl. No. 16/366,847 dated Mar. 27, 2019, 63 pages.
International Search Report and Written Opinion received for PCT Application Serial No. PCT/US2014/072633 dated Sep. 1, 2015, 13 pages.
International Preliminary Report on Patentability received for PCT Application Serial No. PCT/US2014/072633 dated Jul. 13, 2017, 9 pages.
Extended European Search Report received for EP Patent Application Serial No. 15189459.9 dated May 6, 2016, 8 pages.
Communication pursuant to Article 94(3) EPC received for EP Patent Application Serial No. 15189459.9 dated Jul. 15, 2019, 9 pages.
Notice of Reasons for Refusal received for Japanese Patent application Serial No. 2017-534837 dated Oct. 23, 2018, 7 pages (Including English Translation).
Decision of Refusal received for Japanese Patent Application U.S. Appl. No. 2017-534837 dated Mar. 5, 2019, 4 pages (Including English Translation).
First Office Action received for Mexican Patent Application Serial No. MX/a/2017/008740 dated Oct. 12, 2018, 5 pages (Including English Translation).
Second Office Action received for Mexican Patent Application Serial No. MX/a/2017/008740 dated Mar. 22, 2019, 10 pages (Including English Translation).
First Office Action received for Israel Patent Application Serial No. 253064 dated Nov. 7, 2018, 2 pages.
Second Office Action received for Israel Patent Application Serial No. 253064 dated Feb. 3, 2019, 7 pages (Including English Translation).

* cited by examiner

APPLICATION SERVICE DELIVERY THROUGH AN APPLICATION SERVICE AVATAR

CROSS REFERENCE TO RELATED APPLICATION

This application is a continuation of U.S. application Ser. No. 14/584,815, filed 29 Dec. 2014, the disclosure of which is incorporated, in its entirety, by this reference.

BACKGROUND

Connecting rural geographical areas to the power grid and/or the Internet can be difficult and can require a sizable investment, e.g., by network operators, government agencies, power utilities, or others. For at least some of these reasons, many rural areas in developing nations often do not have access to a continuous electrical supply or hard-wired Internet connectivity, e.g., via cable, phone lines, etc. However, with the expanded use of Internet services worldwide, people in these areas sometimes use mobile devices, e.g., low-end cellular telephone handsets ("low-end mobile devices") with limited computational capacity (e.g., slower processor and/or lack of client-side script execution capability). Applications executing (also, "running") on a low-end mobile device often implement a client-server architecture to offload computation and memory consumption to a server and to better facilitate user-to-user interactions. However, wireless networks for these mobile devices may suffer from intermittent network disruptions due to lack of a reliable network infrastructure. For an application that implements a conventional client-server computing architecture, intermittent network disruptions could interfere with proper operations of the application because the application as a client may be unable to receive instructions or data from its corresponding server, e.g., at a time when the instructions or data are needed.

Figure 1:
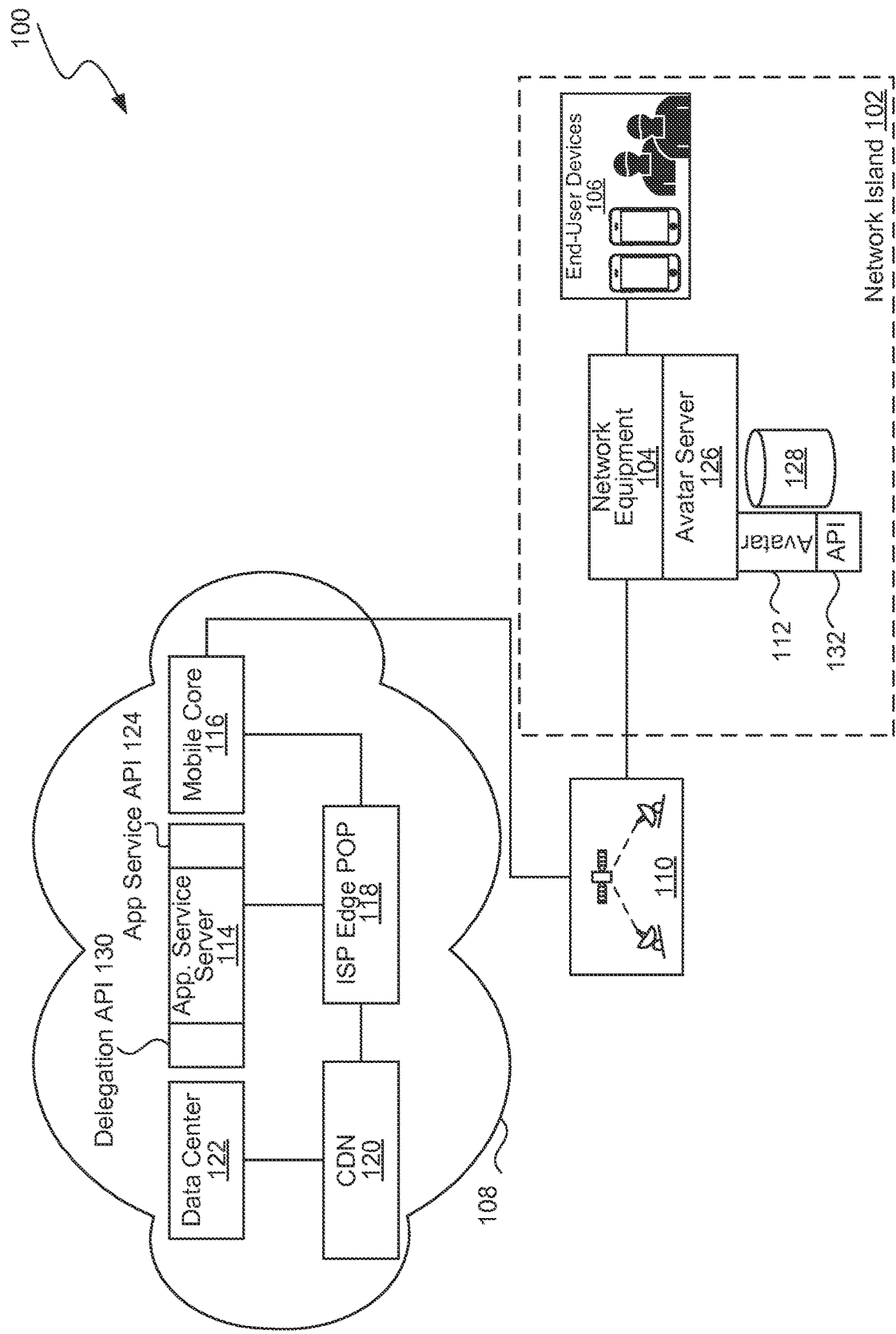
FIG. 1 is a block diagram illustrating a network system environment of a rural networking system, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of the invention described herein.

DETAILED DESCRIPTION

Several embodiments include implementing an application service "avatar" in a local network island that has intermittent connectivity to a wide area network (e.g., the Internet), and therefore, to one or more application service servers corresponding to the application service avatar. The intermittent connectivity may have high latency and/or low bandwidth (e.g., time sliced bandwidth sharing), and may be frequently unavailable. Each application service avatar can correspond to an application service and the one or more application service servers that provide the application service. For example, the application service can be a messaging service, a social networking service, a photo sharing service, a content searching service, a collaboration service, other free basic services (FBSs), or any combination thereof. Normally, without the presence of the application service avatar, one or more end-user devices can request the application service from the one or more application service servers directly. For example, the end-user devices can execute a client program thereon that is configured to access a server service application programming interface ("API") of the one or more application service servers. For example, the client program can be implemented as a mobile application, a desktop application, a browser-based application, or any combination thereof.

The application service avatar can be implemented on an avatar server. The avatar server has computational power; has memory capacity to cache content for a local set of end-user devices and to track profiles of the end-user devices; has continuous connectivity to the local set of end-user devices (while the membership of the local set may change over time); and has at least intermittent connectivity to the one or more application service servers. An avatar server can provide a platform to host a single application service avatar (e.g., as a virtual machine or an avatar application process running on the avatar server) or multiple application service avatars.

Each application service avatar can preserve at least a subset of functionalities that the one or more application service servers normally provide to end-user devices without the presence of the application service avatar. The one or more application service servers can provide a delegation API that exposes service functionalities to the application service avatar and enable the application service avatar to emulate at least a subset of the service functionalities provided by the one or more application service servers despite having only intermittent connectivity to the application service avatar. For example, under this setup, a service task can be partially completed locally, e.g., by an application service avatar, and the completion of the service task can be delayed until the intermittent connectivity is available again.

The application service avatar can, in turn, implement an avatar API. The avatar API can programmatically expose to applications at least a subset of the service functionalities provided by the one or more application service servers, respond to service requests of end-user devices (e.g., cellular telephone handsets or other computing devices) in the local network island connected to the application service avatar, process commands from the one or more application service servers targeting the end-user devices, or any combination thereof. The avatar API can also asynchronously communicate with the one or more application service servers (e.g., asynchronous to receiving the service requests so as to further process the service requests at the one or more application service servers). These service functionalities provided by the avatar API can include, e.g., identifying profiles of the local set of end-user devices, a "store and forward" function when an end-user request is received but the intermittent connectivity is unavailable, caching content (e.g., from the one or more application service servers or other sources in the wide area ("core") network) for the local set of end-user devices, etc.

The disclosed embodiments enable one or more avatar servers to be implemented anywhere between a "backhaul" network and an end-user device. A backhaul network is a portion of a network (e.g., an intranet or the Internet) configured to exchange information with servers connected to the Internet on behalf of intermittently connected clients. For example, the avatar server can be an independent server coupled to a local network access point or an aggregation network appliance. Alternatively, the avatar server can be integrated with the local network access point, the aggregation network appliance, or an end-user device. Avatar servers can communicate with each other or facilitate delayed interactions between an application portal on an end-user device and an application service server.

An application service avatar can service end-user devices within a local geographical region. The application service avatar is capable of providing continuous service (that may be a subset or all of the service functionalities of an application service server) despite there being intermittent network disruptions.

The application service avatar can have intermittent or continuous network access to at least another "network island" (e.g., a connected set of computing devices that are at least intermittently connected to a network and/or a core network (e.g., the Internet). For example, the intermittent network connection may be established by connecting to an external network utilizing a satellite (e.g., a low earth orbit or a geosynchronous orbit satellite), an unmanned aerial vehicle or other airborne vehicle, a train, a ship or other water-based vessel, other intermittently connected communication relay, or any combination thereof. The network islands can together form a "mesh" network. A mesh network is a network topology in which each mesh node (e.g., a network device) relays data for the network and all nodes cooperate in the distribution of data in the network.

In some embodiments, one or more application service avatars can provide basic social network functionalities to users within the network island, including newsfeed, messaging, media browsing, etc. An application service avatar can buffer outgoing communications (e.g., content, messages, data requests, etc.) from one or more devices within the network island when the backhaul network channel is unavailable and can transmit them when the backhaul network channel becomes available. An application service avatar can also receive and cache incoming communications (e.g., webpages, incoming messages, media content, text, scripts, or executables), e.g., from computing devices external to the network island when the backhaul network channel is active so that devices within the network island can access the resources when the backhaul network channel, hence the intermittent network access, is unavailable. For example, an application service avatar can cache recently requested resources, popularly requested resources, and resources matching preference profiles of users in the network island. An application service avatar can provide identities of its users to an application service server. For example, an application service server of a social networking system can generate and store profiles of the users in the local network island to predict what profile-specific resources to "push" to the application service avatar for caching. Pushing involves a data transfer communication in which a data transmission request is initiated by a server (e.g., the application service server) to a destination client (e.g., the application service avatar). As an example, the application service server can push profile-specific resources, commonly accessed publicly available data, or indeed any other type of suitable data.

Profile-specific resources can include data (e.g., personal data) associated with user profiles that are active within the network island. The profile-specific resources of the user profile can also include data associated with affiliated user profiles. For example, an affiliated social network node can be identified based on profile preferences, attributes, behaviors, or activities of the user profile. A different user profile may be affiliated with the user profile due to geographical proximity (e.g., within the same city or threshold distance radius), social proximity (e.g., socially connected to the user profile within a threshold degree of separation in a social graph of the social networking system), or network proximity (e.g., within the same network island).

Some embodiments advantageously provide content access and application service functionalities to rural areas utilizing an application service avatar. The application service avatar provides a technical solution to bandwidth limitation stemming from a backhaul channel that has intermittent connectivity and high latency (e.g., due to time slicing/bandwidth sharing for multiple network constituents). The application service avatar enables at least a subset of the application service functionalities to be delivered to end-users despite the intermittent connectivity of the backhaul channel. The architecture of the application service avatar also improves network speed even in the absence of the backhaul channel by moving server logic "closer" in the network to the end-user devices. The application service avatar further enables peer-to-peer links in a traditional client-server architecture without converting to a complete peer-to-peer architecture. Some application services provide a basic means of communication for rural communities and basic information updates that pertain to people's livelihoods. Accordingly, it can be very useful to enable continuous application services despite there existing only an intermittent backhaul connection.

FIG. 1 is a block diagram illustrating a network system environment of a rural networking system 100, in accordance with various embodiments. The rural networking system 100 comprises a collection of network islands (e.g., a network island 102). Each of the network islands can be established by network equipment 104 (e.g., a network device). The network equipment 104 can be a tower, a box, a router, an access point, or other electronic hardware for providing network connectivity. In some embodiments, one or more devices connected to the network equipment 104 can establish a further sub-networks, and device connected to those sub-networks can establish yet further lower-level networks and so on.

For example, the network equipment 104 can provide network connectivity for end-user devices 106. The end-user devices 106 are computing devices. For example, the end-user devices 106 can include personal computers, mobile phones, tablets, wearable devices, Internet of Things (IoT) devices, or any other mobile or stationary devices. The network connectivity amongst the end-user devices 106 can be established through a wireless protocol, e.g., long-term evolution (LTE), 3G, 2G, Wi-Fi, Wi-Fi Direct, WiMAX, Bluetooth, Bluetooth LE, or any combination thereof. The network connectivity can also be based on a wired protocol, e.g., a universal serial bus (USB) or Ethernet. The network architecture of the network connectivity can be based on a mesh network or a star network.

In some embodiments, each of the network devices can be connected directly or indirectly to a core network 108, e.g., the Internet or other regional network. For example, the network equipment 104 may be connected to the core network 108 via a backhaul network channel 110. The backhaul network channel 110 is a transmission medium that provides connectivity between its endpoints non-continuously. That is, the backhaul network channel 110 may cease to function for a time either periodically or sporadically. Examples of the backhaul network channel 110 include networks implemented by a train, a drone, a satellite, a ship, or any combination thereof.

In some embodiments, the network equipment 104 can provide continuous connectivity amongst the end-user devices 106 in the network island 102 and non-continuous connectivity between the end-user devices 106 and the core network 108. The network equipment 104 may also be connected to other network islands. For example, the network equipment 104 may be connected via another intermittent network channel to another base station, and therefore, other computing devices in another network island coupled to the other base station.

Because of the limitations imposed by the backhaul network channel 110, the network island 102 cannot always communicate with external systems coupled to the core network 108 in real-time. As such, the rural networking system 100 provides mechanisms to facilitate asynchronous application services via an application service avatar 112 corresponding to an application service server 114 (e.g., an application server of a social networking system, a cloud application, or a mobile application server). The application service avatar 112 may be implemented between (e.g., inclusively between) the backhaul network channel 110 and the end-user devices 106 and thereby establishing the network island 102. That is, the application service avatar 112 may be implemented on the rural edge of the rural networking system 100.

In some embodiments, the backhaul network channel 110 may be connected to the end-user devices 106 via a chain of network equipment (e.g., aggregation servers, base stations, switches, routers, or other network-enabled computing devices). Nearest (e.g., in terms of network distance) to the end-user devices 106 can be a mobile core 116, e.g., an evolved packet core (EPC). The EPC provides a converged voice and data networking framework to connect and users via a cellular network, e.g., a long-term evolution (LTE) network.

The mobile core 116 can be connected to an Internet service provider (ISP) edge point of presence (POP) 118. The ISP edge POP 118 is an interface point between communicating entities. For example, the ISP edge POP 118 can provide an interface to communicate data between the mobile core 116 and application service server 114 or between the mobile core 116 and a content delivery network (CDN) 120. A CDN is a system of distributed servers that deliver webpages and other web content to a user based on the geographic locations of the user. The CDN 120 can be specific to an application service or a group of application services (e.g., application services for a social networking system). The CDN 120 can store static content for the application service or the group of application services. In contrast, the application service server 114 can generate dynamic content in response to service requests from the end-user devices 106, including generating a link to a static content provided by the CDN 120 in response to a service request. When the CDN 120 has yet to cache a static content associated with the application service to which the service request is directed, the CDN 120 can access a data center 122 of the application service. In some embodiments, content stored in the CDN 120 is encrypted or encoded to prevent unauthorized access.

The application service avatar 112 can correspond to an application service provided by the application service server 114. For example, the application service can be a messaging service, a social networking service, a photo sharing service, a content searching service, a collaboration service, other free basic services, or any combination thereof. Normally, without the presence of an application service avatar, one or more end-user devices can request an application service from an application service server directly. For example, an end-user device can execute a client program thereon that is configured to access an application service API 124 of the application service server 114. For example, the client program can be one or more mobile applications, desktop applications, browser-based applications (e.g., JavaScript-based, Flash-based, etc.), or any combination thereof.

The application service avatar 112 can be implemented as a virtual machine or an application thread running on an avatar server 126. The application service avatar 112 can access (e.g., read or write) a memory space 128 on the avatar server 126 dedicated to or allocated for the application service avatar 112. In some embodiments, the memory space 128 is partially or wholly encrypted with a cryptographic key that can only be accessed by authenticated agents of the application service server 114. The avatar server 126 has computational power; has memory capacity to cache content for a local set of end-user devices (e.g., the end-user devices 106) and to track profiles of the end-user devices; has continuous connectivity to the local set of end-user devices (although the membership of the local set may change over time); and has intermittent connectivity (e.g., the backhaul network channel 110) to the application service server 114. The avatar server 126 can provide a platform to host only the application service avatar 112 (i.e., a single instance) or multiple application service avatars (i.e., multiple instances) including the application service avatar 112.

The application service avatar 112 can preserve at least a subset of functionalities that the application service server 114 normally provide to the end-user devices (e.g., the end-user devices 106) without the presence of the application service avatar 112. The application service server 114 can provide a delegation API 130 that exposes service functionalities to the application service avatar 112 and enable the application service avatar 112 to emulate at least a subset of the service functionalities provided by the application service server 114 despite intermittent connectivity to the application service avatar 112. For example, under this setup, the completion of a service task corresponding to a service request may be delayed.

A service task, for example, may be a content provisioning task (e.g., a task for a search engine, a media library, a digital yellow book, a news feed, a digital dictionary or encyclopedia, a digital map, a news feed, or any combination thereof) to provide content according to a content specification or preference. The application service avatar 112 can emulate the content provisioning task by pre-caching a content index at the memory space 128. The application service avatar 112 can locate a requested content for a requesting user based on the content index. The application service avatar 112 can update the content index when the intermittent connectivity (e.g., of the backhaul network channel 110) to the application service server 114 is available. The application service avatar 112 can cache previously requested content in a local data bank (e.g., in the memory space 128). In some embodiments, the application service server 114 predictively pushes (e.g., based on user profiles associated with the local network island) content to the local data bank. In some embodiments, the application service avatar 112 pre-fetches (i.e., retrieves) potentially-to-be-requested content from the core network 108 (including the application service server 114) to store in the local data bank prior to a user's request for the content. The pre-fetching can occur by predicting the potentially-to-be-requested content based on user profiles associated with the local network island and fetching the content when the backhaul network channel 110, and thus intermittent connectivity, is available. The application service avatar 112 can update the content index based on what information/content is cached in the local data bank. When locating requested content, the application service avatar 112 can first try to locate the requested content from the local data bank according to the content index. If the requested content is unavailable in the local data bank, the application service avatar 112 can identify the network location of the content in the core network 108. If the backhaul network channel 110 is unavailable, the application service avatar 112 generates a fetch request to store in a fetch queue. When the application service avatar 112 detects that the backhaul network channel 110 is available, the application service avatar 112 starts fetching content identified in the fetch queue and storing the fetched content in the local data bank. In some embodiments, once the content is fetched, the application service avatar 112 forwards the content to an end-user device of the requesting user or notifies the end-user device that the content is available for retrieval from the local data bank.

A service task, for example, may be a content routing task (e.g., a task for a messaging application, a bulletin board, a social networking application, an event management application, a collaboration application, or any combination thereof) to route user-to-user or device-to-device message. Upon receiving a content routing request, the application service avatar 112 identifies a destination for the message and a destination profile (e.g., a user profile, a group profile, a page profile, a bulletin board profile) associated with the destination. The application service avatar 112 can maintain a list of profiles of local entities in the memory space 128. Each of the profiles can include a unique identification, a frequency of connectivity to the network island 102, a current location, a content preference, or any combination thereof. When the destination profile is found within the list of profiles, the application service avatar 112 can deliver the message to an end-user device associated with the destination profile immediately. When the destination profile is not found within the list of profiles, the application service avatar 112 can determine whether the backhaul network channel (e.g., the backhaul network channel 110) is available. When available, the application service avatar 112 can send the message out to the application service server 114 to route to its destination. When unavailable, the application service avatar 112 can queue the message in an outgoing queue and wait until the backhaul network channel is available to send the message to the application service server 114.

A service task, for example, may be a content publishing task (e.g., a task to update a status, publish a blog, publish a local advertisement, announce an event, announce an auction, announce an item or service for sale, or any combination thereof) to push content to a sharable public domain. In response to receiving a content publishing request, the application service avatar 112 can store the to-be-published content in the local data bank, and forward the to-be-published content to the application service server 114 for publication (e.g., news feed production). If the backhaul network channel 110 is unavailable, the content is queued for forwarding when the backhaul network channel 110 becomes available again. In some embodiments, the application service avatar 112 can pre-publish the to-be-published content locally in a local version of the publishing platform (e.g., newsletter, blog, auction site, profile page, announcement page, events site, wiki, or any combination thereof) stored in the memory space 128. The local version of the publishing platform can be available even when the backhaul network channel 110 to the core network 108 is unavailable. The application service avatar 112 can synchronize the local version with the global version via the application service server 114 when the backhaul network channel 110 becomes available.

In some embodiments, the application service avatar 112 can determine and select a time to communicate (e.g., performing synchronization, sending messages, forwarding task requests, etc.) with the application service server 114. For example, the selected time may be the "best time" selected based on real-time bandwidth availability of the backhaul network channel 110, congestion level of the backhaul network channel 110, expense associated with using the backhaul network channel 110, application requirement(s) associated with the communication, or any combination thereof.

The application service avatar 112 can, in turn, implement an avatar API 132. The avatar API 132 can expose at least a subset of the service functionalities provided by the one or more application service servers, respond to service requests of end-user devices in the network island 102 connected to the application service avatar 112, process commands from the application service server 114 targeting the end-user devices 106, or any combination thereof. The avatar API 132 can also communicate with the application service server 114 asynchronously to send the service requests (e.g., to further process the service requests at the application service server 114) or receive content or commands. These service functionalities provided by the avatar API 132 can include identifying profiles of the local set of the end-user devices 106, a "store and forward" function when an end-user request is received but the backhaul network channel 110 is unavailable, caching content (e.g., from the application service server 114 or other sources in the core network 108) for the local set of the end-user devices 106, etc.

The application service avatar 112 presents an opportunity to provide a continuous application service to an end-user device in a remote area, despite the end-user device being connected to the application service server 114 via the backhaul network channel 110. The application service avatar 112 can serve content and services from a network access edge on the side of the backhaul network channel 110 facing the end-user device. The application service avatar 112 can provide off-line and local experiences by pre-caching content that can be distributed to the end-user devices 106 or delivering messages amongst end-user devices 106.

Figure 2:
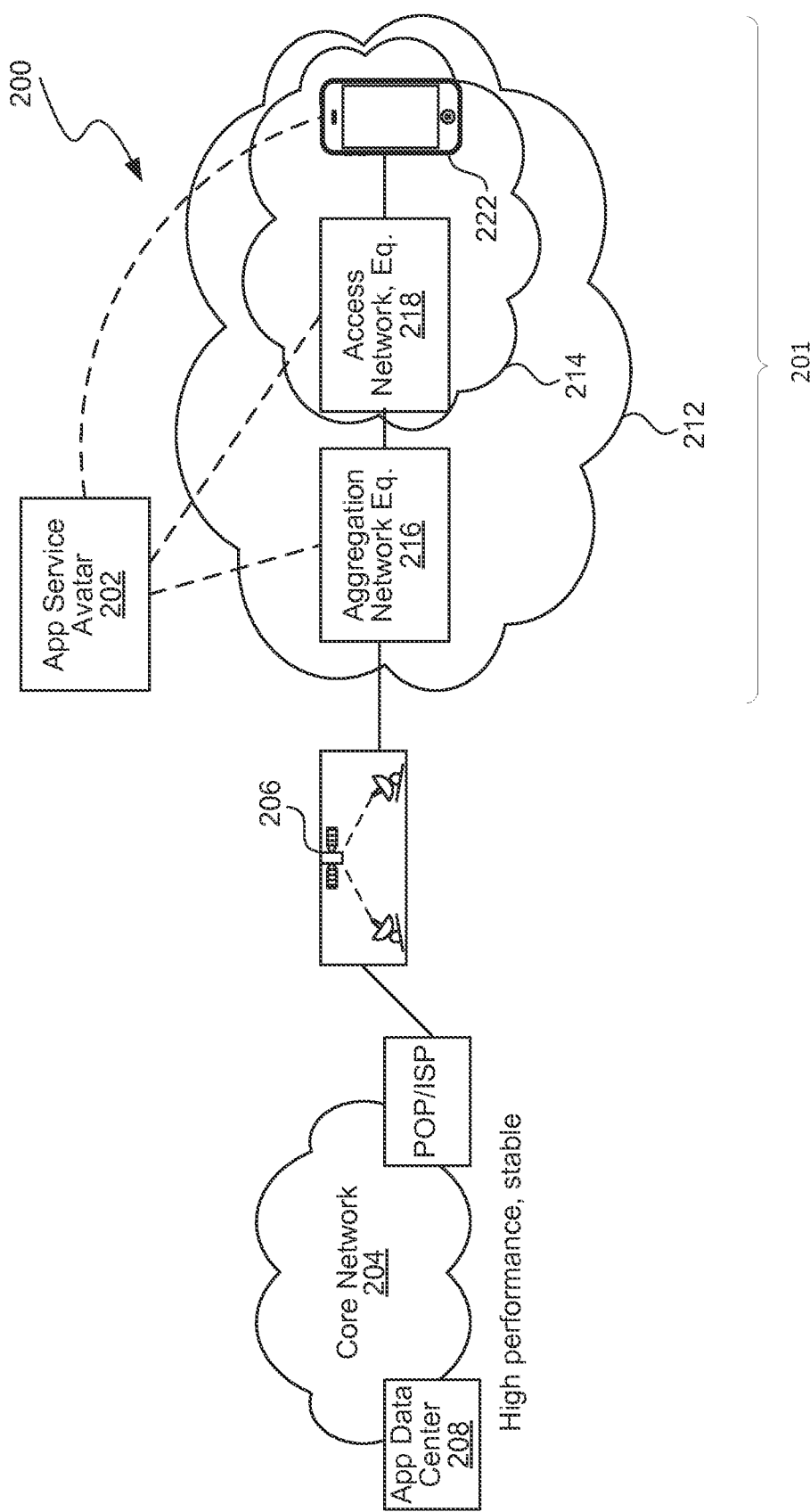
FIG. 2 is a block diagram illustrating potential locations to implement an application service avatar on a rural edge of a rural networking system, in accordance with various embodiments.

FIG. 2 is a block diagram illustrating potential locations to implement an application service avatar 202 (e.g., the application service avatar 112 of FIG. 1) on a rural edge 201 of a rural networking system 200 (e.g., the rural networking system 100 of FIG. 1), in accordance with various embodiments. The rural edge 201 is coupled to a core network 204 via a backhaul network 206. The core network 204 comprises multiple interconnected computing devices and computer servers. For example, the core network 204 can include an application data center 208 (e.g., the data center 122 of FIG. 1) and an ISP POP 206 (the ISP edge POP 118 of FIG. 1).

The application service avatar 202 can be implemented on various devices in the rural edge 201. The closer the application service avatar 202 is implemented toward the backhaul network 206, the more users can benefit from the application service avatar 202 and the more service functionalities can be utilized. The closer the application service avatar is implemented toward the end-user device, the faster the response time will be for service requests. For example, the application service avatar 202 can be implemented in an aggregation network 212 or an access network 214. The aggregation network 212 can be established by an aggregation network equipment 216, for example, a radio network controller (RNC), a base station controller (BSC), or a microwave controller. The access network 214 can be established by an access network equipment 218, for example, a 3G base station, a Wi-Fi access point, or a router. The application service avatar 202 may be implemented by the aggregation network equipment 216 or by the access network equipment 218. The application service avatar 202 may instead be implemented in an avatar server (e.g., the avatar server 126 of FIG. 1) in network communication with either the aggregation network equipment 216, the access network equipment 218, or a network equipment associated with the backhaul network 206.

In some embodiments, the application service avatar 202 can be implemented in one of the end-user devices, for example, an end-user device 222. In some embodiments, an instance of the application service avatar 202 is implemented and active on each of the end-user devices. In some embodiments, an instance of the application service avatar 202 is implemented on each of the end-user devices, but only a subset of these instances is active. For example, an application service server (e.g., the application service server 114 of FIG. 1) associated with the application service avatar 202 can select at least one of the end-user devices to host an active instance of the application service avatar 202. The application service server can select the end-user device based on its capability (e.g., availability of network interfaces and protocols), specification (e.g., processor type or maximum memory space), resource capacity (e.g., available battery power, available memory space, available bandwidth, or available processing power), and/or connectivity (e.g., capable of communicating with a certain number of other end-user devices) as compared to the other end-user devices. For another example, an active instance of the application service avatar 202 can activate a dormant instance of the application service avatar 202 in another end-user device based on the capability, specification, resource capacity, and/or connectivity of the other end-user device. For example, this activation process may be a process to handover the role of the application service avatar 202 from one end-user device to another. This enables the implementation of the application service avatar 202 to be dynamic. In some embodiments, the selective activation of these instances may be controlled by the application service server. In several embodiments in which the application service avatar 202 is implemented in an end-user device, the instances of the application service avatar 202 are controlled and configured by the application service server and not the end-users to protect the privacy of the data managed by the application service avatar 202. This can be achieved via security mechanisms, including for example, cryptographic authentication via cryptographic keys.

Figure 3:
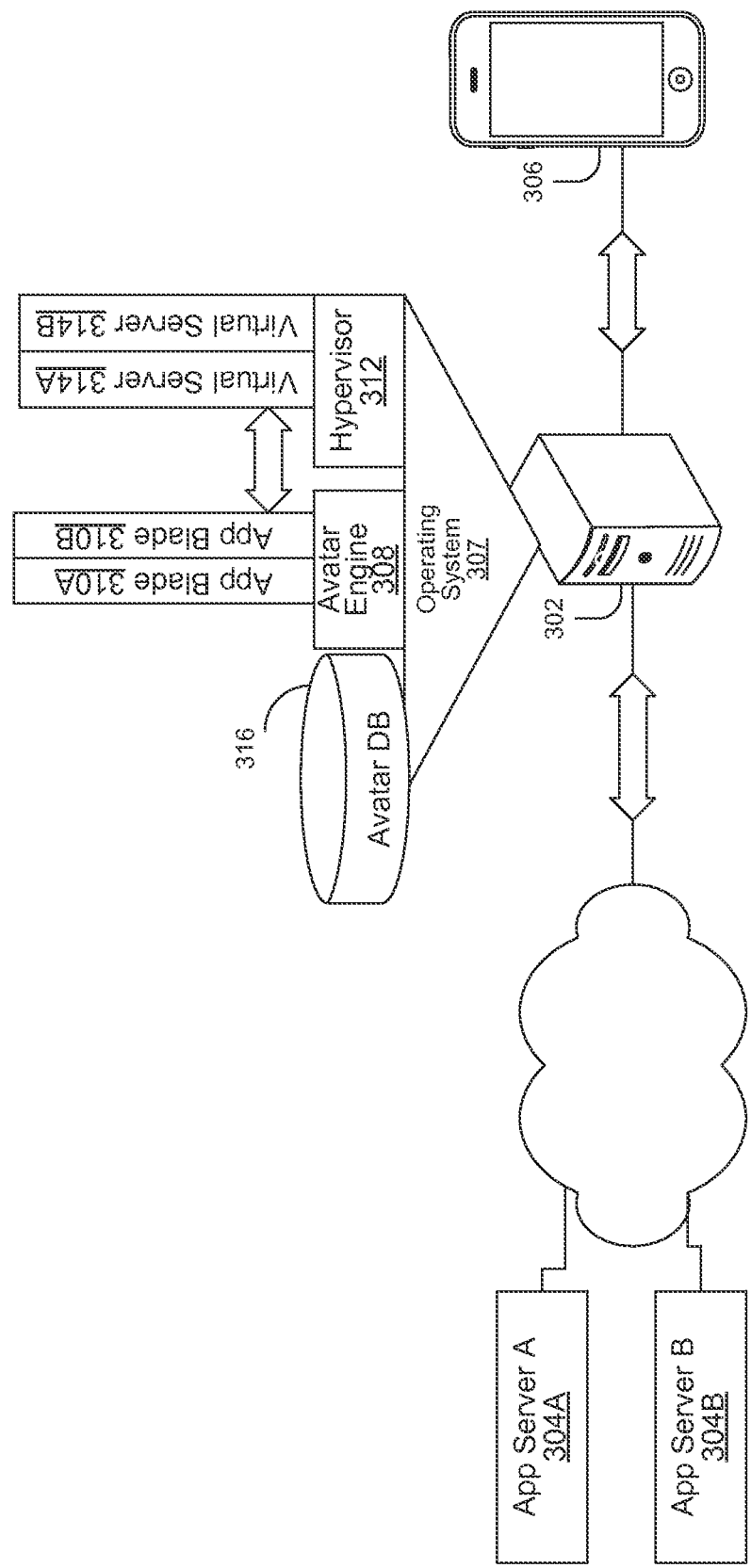
FIG. 3 is a block diagram illustrating an example of a system environment that may be used to implement an application service avatar, in accordance with various embodiments.

FIG. 3 is a block diagram illustrating an example of a system environment that may be used to implement an application service avatar (e.g., the application service avatar 112 of FIG. 1), in accordance with various embodiments. In several embodiments, the application service avatar is implemented on an avatar server 302. The avatar server 302 is at least intermittently connected to one or more application service servers (e.g., an application service server 304A and an application service server 304B, collectively as the "application service servers 304"). The avatar server 302 is continuously connected to a local network including a dynamic set of one or more end-user devices 306.

The avatar server 302 can run an avatar engine 308 on its operating system 307. The avatar engine 308 enables one or more avatar processes to run on the avatar server 302. In some embodiments, each of the avatar processes corresponds to a single application service avatar that corresponds to a different application service. In some embodiments, each of the avatar processes can be implemented on a different set of hardware. For example, avatar processes can be implemented respectively on server blades (e.g., an application blade 310A and an application blade 310B, collectively as the "application server blades 310"). Each of the application server blades 310 can have independent processors, independent operating memory, independent persistent data storage, or any combination thereof. The application server blades 310 can share a network interface, a power supply, persistent data storage, or any combination thereof.

In some embodiments, the avatar server 302 can implement a hypervisor 312 for computer virtualization. The hypervisor 312 can implement one or more virtual avatar servers (e.g., virtual server 314A and virtual server 314B, collectively as the "virtual avatar servers 314"). Each of the virtual avatar servers 314 can implement a single application service avatar or multiple application service avatars. In some embodiments, one or more application service avatars running on the hypervisor 312, on the application server blades, and/or on the operating system 307 can communicate with each other and other application service avatars within its network environment.

In some embodiments, the avatar server 302 can implement an avatar database 316. The avatar database 316 can be implemented in the operating system 307, one or more of the application server blades 310, or one or more of the virtual avatar servers 314. The avatar database 316 can include cached content, an index of the cached content, device profiles of the end-user devices 306, user profiles associated with the end-user devices 306, a message queue for messages to the application service servers 304 or other devices that are delayed by the unavailability of a backhaul network channel that is intermittent, or any combination thereof.

Figure 4:
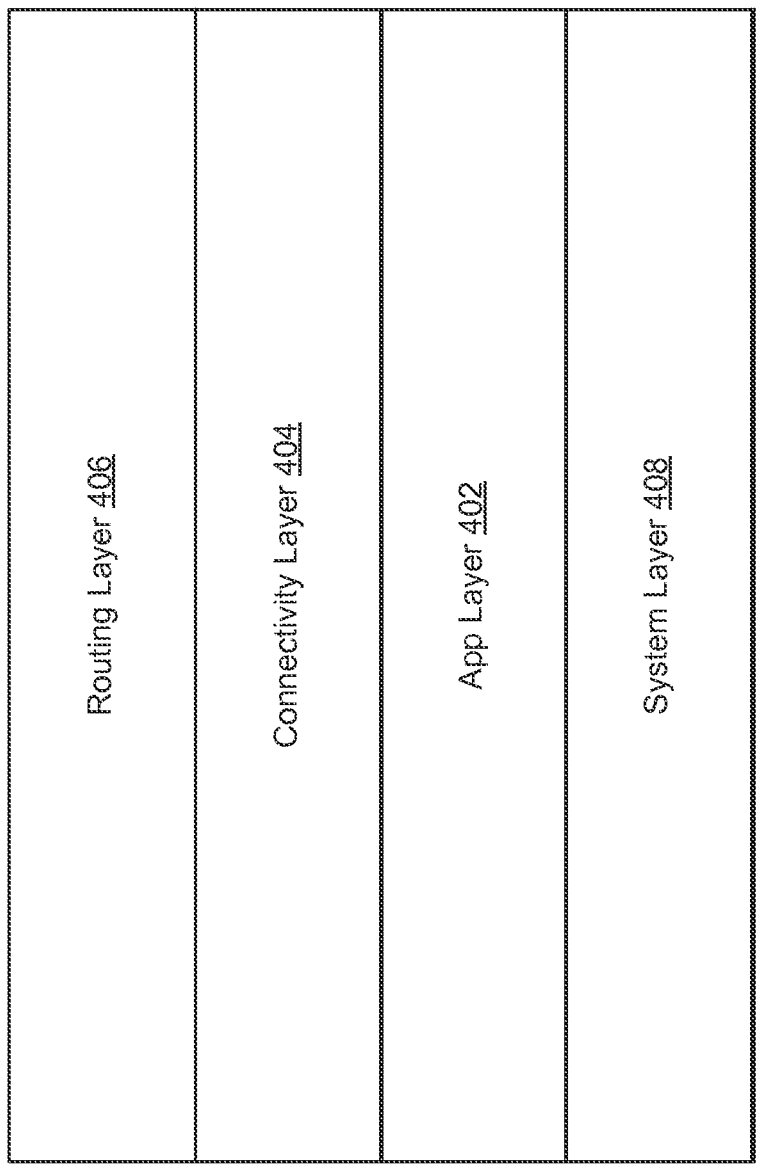
FIG. 4 is a functional block diagram illustrating an application programming interface (API) of an application service avatar, in accordance with various embodiments.

FIG. 4 is a functional block diagram illustrating an avatar application programming interface (API) 400 of an application service avatar, in accordance with various embodiments. The avatar API 400 can be the avatar API 132 of FIG. 1. The application service avatar can be the application service avatar 112 of FIG. 1 or the application service avatar 202 of FIG. 2. The avatar API 400 includes an application layer 402, a connectivity layer 404, a routing layer 406, a system layer 408, or any combination thereof.

The application layer 402 is configured to queue one or more messages to send to an application service server (e.g., the application service server 114 of FIG. 1) corresponding to the application service avatar. For example, the application layer 402 can accomplish this using a quality of service (QoS) mechanism. A QoS mechanism is a resource reservation control mechanism to facilitate computer network messaging traffic. For example, the resource reservation control mechanism can implement an as-soon-as-possible (ASAP) queue, an "Expire-After" queue, a priority-based queue, or any combination thereof.

The application layer 402 can determine whether it is possible to send a message from the queue to the application service server. When it is possible to send the message, the application layer 402 can maintain and/or invoke a client application stub. The client application stub is implemented by executable instructions used to convert parameters passed during a remote procedure call (RPC). An RPC enables a client computer (e.g., the application service avatar) to remotely call procedures (e.g., executable objects, functions or processes) on a server computer (e.g., the application service server). The parameters used in a function call have to be converted because the client and server computers use different address spaces. The client application stub performances convergence so that the remote server computer receives the RPC as a local function call.

The connectivity layer 404 monitors one or more network interfaces available to an avatar server (e.g., an avatar server in any of the devices described in FIG. 2) hosting the application service avatar. The connectivity layer 404 can determine whether the avatar server is connected to one or more local end-user devices (e.g., the end-user devices 106 of FIG. 1) and/or whether the avatar server is connected to the application service server. The connectivity layer 404 can maintain a list of all connected devices, which includes device profiles (e.g., software and hardware capabilities, resource capacities, specifications, connectivity availabilities, identities, or any combination thereof) and/or user profiles (e.g., social network, location-based profile, network access preferences, or any combination thereof) associated with the connected devices.

The connectivity layer 404 can send an interrupt message (e.g., a ping message) to at least one of the other layers (e.g., the application layer 402 or the routing layer 406) when an end-user device connects or disconnects. The connectivity layer 404 can send an interrupt message to at least one of the other layers when a backhaul network channel is disconnected (e.g., the application service server becomes disconnected). For example, the connectivity layer 404 can send an interrupt message to one or more client application stubs maintained by the application layer 402. The connectivity layer 404 can also maintain an expected schedule of when the backhaul network channel is to be available. In some embodiments, the connectivity layer 404 can maintain a cost map associated with using the backhaul network channel. For example, this can enable the routing layer 406 to cost optimize network usage of the application service avatar. The connectivity layer 404 can further set the backhaul QoS parameters for a QoS queue for the application service server (e.g., for when an intermittent connectivity becomes available). The connectivity layer 404 can also receive messages or content for a client application stub (e.g., corresponding to an application service provided by the application service avatar). The application service server (e.g., via the delegation API 130 of FIG. 1) can send the message or content as a push message.

The routing layer 406 can facilitate message or content traffic between the end-user devices and the application service server. The routing layer 406 can use the connectivity information and profile information maintained by the connectivity layer 404 to determine how and when to route the messages. For example, for an incoming message from the application service server, the routing layer 406 can determine from the connectivity layer 404 whether an end-user device is connected or frequently connects to the application service avatar associated with a user profile targeted by the incoming message. As another example, for an outgoing message from an end-user device, the routing layer 406 can determine from the connectivity layer 404 the identity of the target device. If the target device is the application service server or another computing device connected via an intermittent network channel, the connectivity layer 404 can respond to the routing layer 406 with an expected time of delivery and/or facilitate placing the message in the message queue. If the target device is an end-user device connected to the application service avatar, then the connectivity layer 404 can provide to the routing layer 406 information necessary to facilitate routing the message to the target device locally.

The system layer 408 can register or unregister a client application stub with QoS parameters. The system layer 408 can also record and store system logs. The system logs can include, for example, the QoS parameters associated with each client application stub, the messages sent to/from the application service server or the end-user devices, operations performed by the layers of the avatar API 400, errors or exceptions regarding a service task, and/or any combination thereof.

The modules implemented in the application service servers and/or the avatar servers (e.g., the application service API 124, the delegation API 130, the avatar API 132, or the avatar API 400) can be implemented as hardware components, software components, or any combination thereof. For example, the modules described can be software components implemented as instructions on a non-transitory memory capable of being executed by a processor or a controller on a computer system described in FIG. 6. As another example, the methods and other techniques introduced in the modules can be implemented by programmable circuitry programmed or configured by software and/or firmware, or they can be implemented entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Each of the modules can operate individually and independently of other modules. Some or all of the modules can be combined as one module. A single module can also be divided into sub-modules, each performing a separate method step or method steps of the single module. The modules can share access to a memory space. One module can access data accessed by or transformed by another module. The modules can be considered "coupled" to one another if they share a physical connection or a virtual connection, directly or indirectly, enabling data accessed or modified from one module to be accessed in another module. Each "memory space" or "data bank" can be implemented with data storage devices and can operate individually and independently of other data storages. Some or all of the data storages can be combined as one data storage. A single data storage can also be divided into sub-storages, each containing a portion of the single data storage.

The storages, or "stores," described are hardware components or portions of hardware components for storing digital data. Each storage can be a single physical entity or distributed through multiple physical devices. Each storage can be on separate physical devices or share the same physical device or devices. Each storage can allocate specific storage spaces for run-time applications, processes, or modules.

Figure 5:
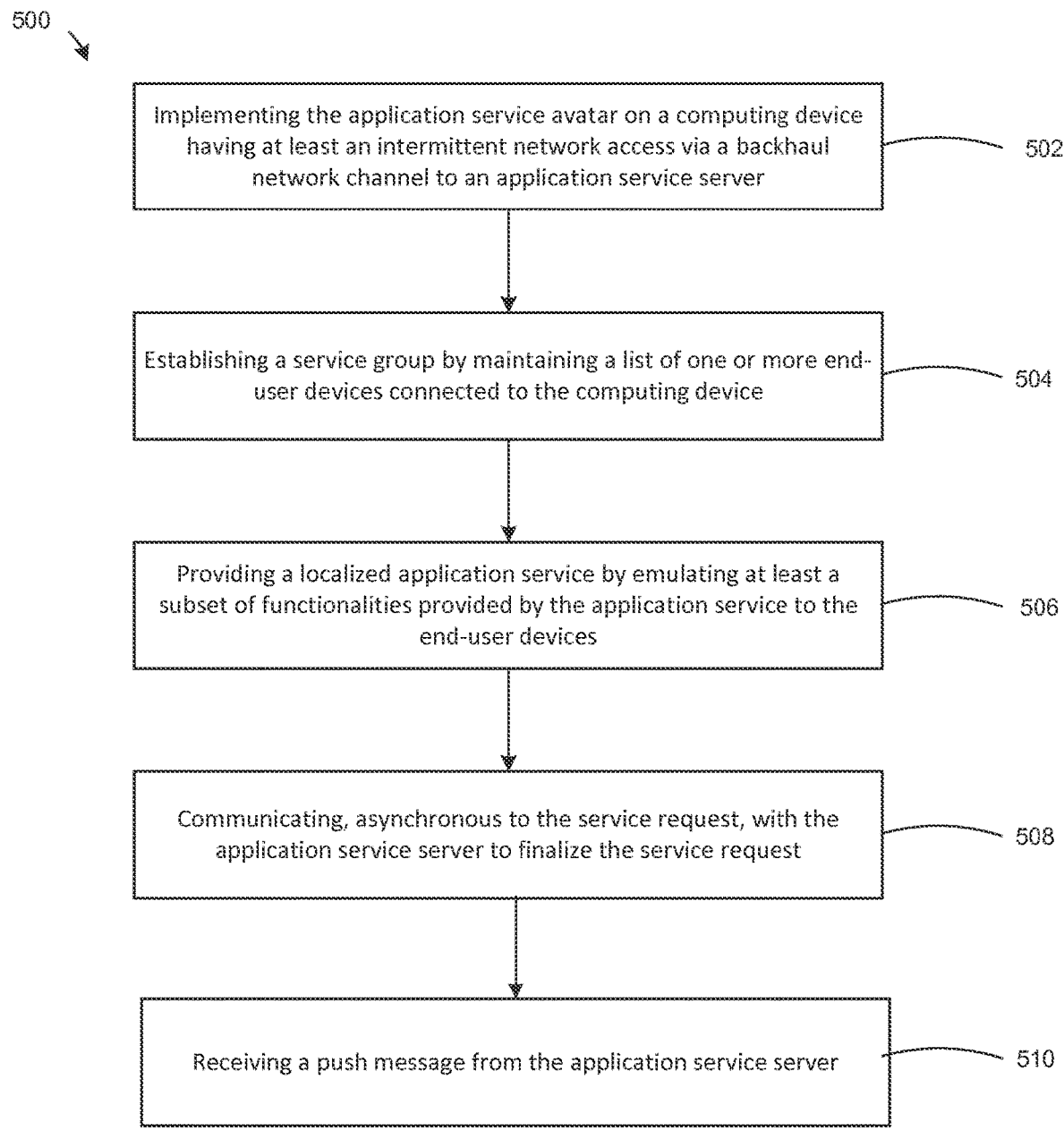
FIG. 5 is a flow chart illustrating a method of operating a computing device as an application service avatar, in accordance with various embodiments.

FIG. 5 is a flow chart illustrating a method 500 of operating a computing device (e.g., the avatar server 126 of FIG. 1) as an application service avatar (e.g., the application service avatar 112 of FIG. 1), in accordance with various embodiments. At block 502, the computing device implements the application service avatar. The computing device can have at least an intermittent network access via a backhaul network channel to an application service server (e.g., the application service server 114 of FIG. 1) for providing an application service to client applications.

At block 504, the computing device can establish a service group by maintaining a list of one or more end-user devices connected to the computing device to access the application service. For example, block 504 can include the computing device maintaining device profiles for the end-user devices and user profiles associated with the end-user devices.

At block 506, the computing device provides a localized application service by emulating at least a subset of functionalities provided by the application service to the end-user devices. For example, providing the localized application service can include locally processing, at least partially, a service request from at least one of the end-user devices at the avatar server. Processing the service request can include invoking a client application stub that converts parameters during a remote procedure call on behalf of one of the end-user devices to the application service server.

In some embodiments, providing the localized application service can include receiving the service request from at least a first end-user device in the service group. The service request can involve a second end-user device in the service group. Providing the localized application service can further include processing the service request, at least partially, by communicating a message to the second end-user device on behalf of the first end-user device. Communicating the message may be in response to determining that the backhaul network channel is unavailable or that the application service server is unreachable. Processing the service request can include identifying the message indicated by, referenced in, or derived from the service request.

In some embodiments, providing the localized application service can include receiving a data processing request (e.g., a data conversion request) for a media content from one of the end-user devices. For example, an end-user can send a voice command intended for the application service. The voice command may include a voice recognition and/or translation processing task. The computing device can convert the media content using the application service avatar by utilizing a local version of a processing module stored in the avatar server.

In some embodiments, providing the localized application service can include receiving a content provisioning request including a content identifier from a requesting device among the end-user devices. The computing device can locate content via the content identifier in a local data bank available to or in the computing device. When the computing device is unable to locate the content in the local data bank and when the backhaul network channel is unavailable, the computing device queues a content request for the content to the application service server, for subsequent delivery of the content to the requesting device. When the computing device is unable to locate the content in the local data bank and when the backhaul network channel is available, the computing device fetches the content from the application service server to deliver to the requesting device. When the computing device locates the content in the local data bank, the computing device serves the content to the requesting device.

In some embodiments, providing the localized application service includes receiving a content publishing request including publishable content from a requesting device among the end-user devices. The computing device can then pre-publish the publishable content within the service group by making the publishable content available to the service group prior to sending the publishable content to the application service server.

At block 508, the computing device can communicate, asynchronous to the service request, with the application service server to finalize the service request. The logic of block 508 can be performed in response to determining that the backhaul network channel is available.

At block 510, the computing device can receive a push message from the application service server. The push message can be a system update for the application service avatar. For example, block 510 can include receiving an update to the local version of the processing module from the application service server. The push message can also be a message intended for one of the end-user devices in the service group.

While processes or methods are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Figure 6:
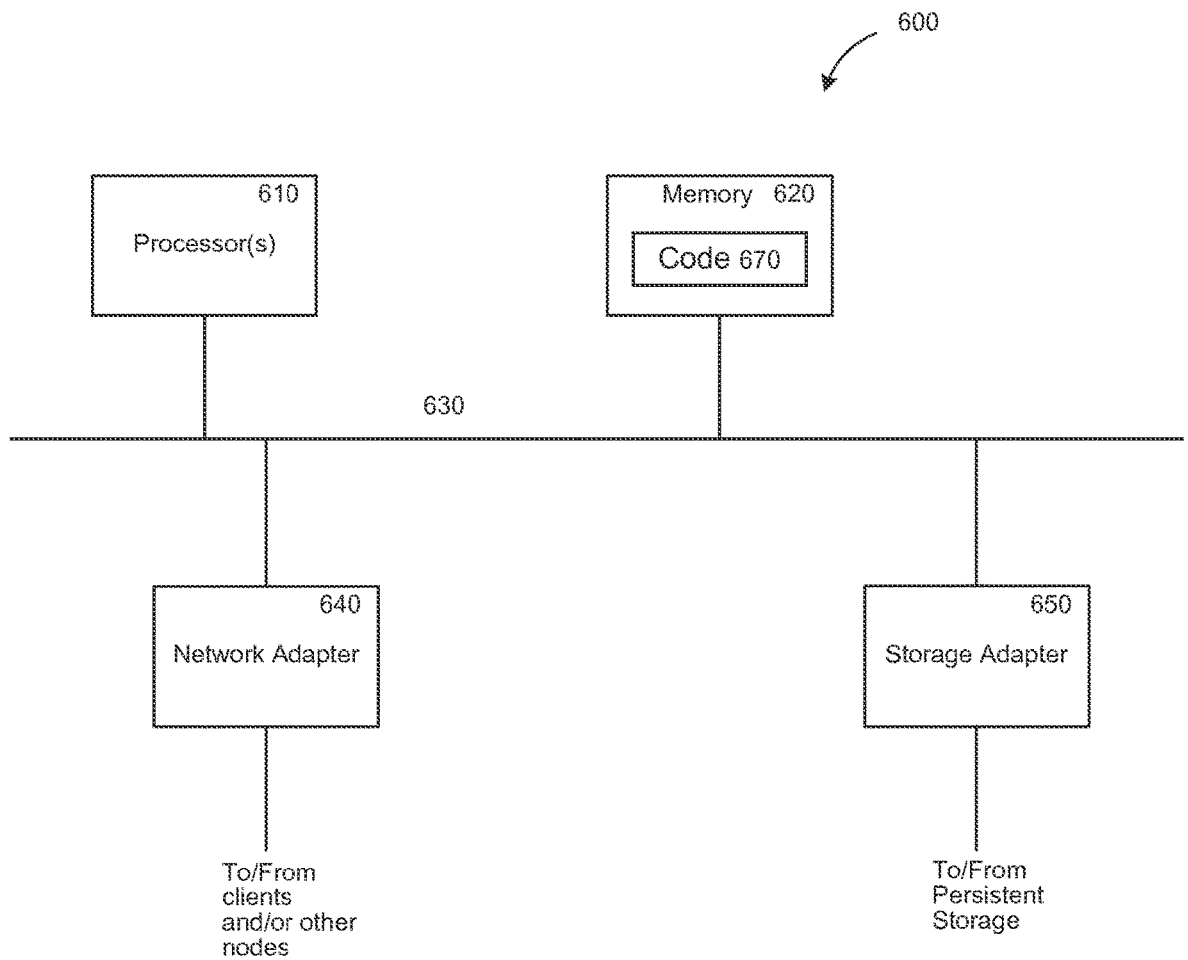
FIG. 6 is a block diagram of an example of a computing device, which may represent one or more computing device or server described herein, in accordance with various embodiments.

FIG. 6 is a block diagram of an example of a computing device 600, which may represent one or more computing device or server described herein, in accordance with various embodiments. The computing device 600 can be one or more computing devices that implement the application service avatar 112 of FIG. 1, the application service server 114 of FIG. 1, or methods and processes described in this disclosure (e.g., the method 500 of FIG. 5). The computing device 600 includes one or more processors 610 and memory 620 coupled to an interconnect 630. The interconnect 630 shown in FIG. 6 is an abstraction that represents any one or more separate physical buses, point-to-point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or a "Firewire".

The processor(s) 610 is/are the central processing unit (CPU) of the computing device 600 and thus controls the overall operation of the computing device 600. In certain embodiments, the processor(s) 610 accomplishes this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the computing device 600. The memory 620 represents any form of random access memory (RAM), read-only memory (ROM), flash memory, or the like, or a combination of such devices. In use, the memory 620 may contain a code 670 containing instructions according to the mesh connection system disclosed herein.

Also connected to the processor(s) 610 through the interconnect 630 are a network adapter 640 and a storage adapter 650. The network adapter 640 provides the computing device 600 with the ability to communicate with remote devices, over a network and may be, for example, an Ethernet adapter or Fibre Channel adapter. The network adapter 640 may also provide the computing device 600 with the ability to communicate with other computers. The storage adapter 650 enables the computing device 600 to access a persistent storage, and may be, for example, a Fibre Channel adapter or SCSI adapter.

The code 670 stored in memory 620 may be implemented as software and/or firmware to program the processor(s) 610 to carry out actions described above. In certain embodiments, such software or firmware may be initially provided to the computing device 600 by downloading it from a remote system through the computing device 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Social Networking System Overview

Various embodiments of the disclosed application services utilize or are part of a social networking system. Social networking systems commonly provide mechanisms enabling users to interact with objects and other users both within and external to the context of the social networking system. A social networking system user may be an individual or any other entity, e.g., a business or other nonperson entity. The social networking system may utilize a web-based interface or a mobile interface comprising a series of inter-connected pages displaying and enabling users to interact with social networking system objects and information. For example, a social networking system may display a page for each social networking system user comprising objects and information entered by or related to the social networking system user (e.g., the user's "profile"). Social networking systems may also have pages containing pictures or videos, dedicated to concepts, dedicated to users with similar interests ("groups"), or containing communications or social networking system activity to, from or by other users. Social networking system pages may contain links to other social networking system pages, and may include additional capabilities, e.g., search, real-time communication, content-item uploading, purchasing, advertising, and any other web-based inference engine or ability. It should be noted that a social networking system interface may be accessible from a web browser or a non-web browser application, e.g., a dedicated social networking system application executing on a mobile computing device or other computing device. Accordingly, "page" as used herein may be a web page, an application interface or display, a widget displayed over a web page or application, a box or other graphical interface, an overlay window on another page (whether within or outside the context of a social networking system), or a web page external to the social networking system with a social networking system plug in or integration capabilities.

As discussed above, a social graph can include a set of nodes (representing social networking system objects, also known as social objects) interconnected by edges (representing interactions, activity, or relatedness). A social networking system object may be a social networking system user, nonperson entity, content item, group, social networking system page, location, application, subject, concept or other social networking system object, e.g., a movie, a band, or a book. Content items can include anything that a social networking system user or other object may create, upload, edit, or interact with, e.g., messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Subjects and concepts, in the context of a social graph, comprise nodes that represent any person, place, thing, or idea.

A social networking system may enable a user to enter and display information related to the user's interests, education and work experience, contact information, demographic information, and other biographical information in the user's profile page. Each school, employer, interest (for example, music, books, movies, television shows, games, political views, philosophy, religion, groups, or fan pages), geographical location, network, or any other information contained in a profile page may be represented by a node in the social graph. A social networking system may enable a user to upload or create pictures, videos, documents, songs, or other content items, and may enable a user to create and schedule events. Content items and events may be represented by nodes in the social graph.

A social networking system may provide various means to interact with nonperson objects within the social networking system. For example, a user may form or join groups, or become a fan of a fan page within the social networking system. In addition, a user may create, download, view, upload, link to, tag, edit, or play a social networking system object. A user may interact with social networking system objects outside of the context of the social networking system. For example, an article on a news web site might have a "like" button that users can click. In each of these instances, the interaction between the user and the object may be represented by an edge in the social graph connecting the node of the user to the node of the object. A user may use location detection functionality (such as a GPS receiver on a mobile device) to "check in" to a particular location, and an edge may connect the user's node with the location's node in the social graph.

A social networking system may provide a variety of communication channels to users. For example, a social networking system may enable a user to email, instant message, or text/SMS message, one or more other users; may enable a user to post a message to the user's wall or profile or another user's wall or profile; may enable a user to post a message to a group or a fan page; or may enable a user to comment on an image, wall post or other content item created or uploaded by the user or another user. In least one embodiment, a user posts a status message to the user's profile indicating a current event, state of mind, thought, feeling, activity, or any other present-time relevant communication. A social networking system may enable users to communicate both within and external to the social networking system. For example, a first user may send a second user a message within the social networking system, an email through the social networking system, an email external to but originating from the social networking system, an instant message within the social networking system, and an instant message external to but originating from the social networking system. Further, a first user may comment on the profile page of a second user, or may comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection is a social network edge. Being friends in a social networking system may allow users access to more information about each other than would otherwise be available to unconnected users. For example, being friends may allow a user to view another user's profile, to see another user's friends, or to view pictures of another user. Likewise, becoming friends within a social networking system may allow a user greater access to communicate with another user, e.g., by email (internal and external to the social networking system), instant message, text message, phone, or any other communicative interface. Being friends may allow a user access to view, comment on, download, endorse or otherwise interact with another user's uploaded content items. Establishing connections, accessing user information, communicating, and interacting within the context of the social networking system may be represented by an edge between the nodes representing two social networking system users.

In addition to explicitly establishing a connection in the social networking system, users with common characteristics may be considered connected (such as a soft or implicit connection) for the purposes of determining social context for use in determining the topic of communications. In at least one embodiment, users who belong to a common network are considered connected. For example, users who attend a common school, work for a common company, or belong to a common social networking system group may be considered connected. In at least one embodiment, users with common biographical characteristics are considered connected. For example, the geographic region users were born in or live in, the age of users, the gender of users and the relationship status of users may be used to determine whether users are connected. In at least one embodiment, users with common interests are considered connected. For example, users' movie preferences, music preferences, political views, religious views, or any other interest may be used to determine whether users are connected. In at least one embodiment, users who have taken a common action within the social networking system are considered connected. For example, users who endorse or recommend a common object, who comment on a common content item, or who RSVP to a common event may be considered connected. A social networking system may utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Some embodiments of the disclosure have other aspects, elements, features, and steps in addition to or in place of what is described above. These potential additions and replacements are described throughout the rest of the specification.

For example, some embodiments include an avatar server comprising: one or more network interface configured to connect to a local set of one or more end-user devices and to connect, at least intermittently via a backhaul network channel, to an application service server that provides an application service; a processor configured to host an application service avatar that communicates with the application service server when the backhaul network channel is available, wherein the application service avatar provides an avatar application programming interface (API); wherein the avatar API provides a localized application service via the application service avatar by emulating at least a subset of functionalities provided by the application service to the end-user devices; and a memory to cache content for the local set of the end-user devices and to track profiles of the end-user devices. The avatar server can be implemented on a network equipment that provides network access or aggregate communication data for the end-user devices. The avatar server can be implemented independently from network equipment that provide network access for the end-user devices. The avatar server can be implemented on at least one of the end-user devices.

Some embodiments include a computer-readable storage memory (e.g., non-transitory data storage memory) storing computer-executable instructions for operating an avatar server. The computer-readable storage memory can include instructions for implementing an application service avatar in the avatar server, wherein the avatar server has at least an intermittent network access via a backhaul network channel to an application service server, wherein the application service server provides an application service to client applications; instructions for establishing a service group by maintaining a list of one or more end-user devices connected to the avatar server to access the application service; instructions for receiving a service request at the avatar server from at least a first end-user device in the service group, wherein the service request involves a second end-user device in the service group; and instructions for processing the service request, at least partially, by communicating a message to the second end-user device on behalf of the first end-user device. The computer-readable storage memory can further include instructions for providing a localized application service via the avatar server by emulating at least a subset of functionalities provided by the application service to the end-user devices. The computer-readable storage memory can further include instructions for asynchronously communicating the service request to the application service server when the backhaul network channel is available. The computer-readable storage memory can further include instructions for invoking a client application stub that converts parameters during a remote procedure call on behalf of one of the end-user devices to the application service server. The computer-readable storage memory can further include instructions for maintaining device profiles for the end-user devices and user profiles associated with the end-user devices.

In some embodiments, a method comprises: implementing an application service avatar at an avatar server that has at least an intermittent network access via a backhaul network channel to an application service server for providing an application service to client applications; establishing a service group by maintaining a list of one or more end-user devices connected to the avatar server to access the application service; providing, to the end-user devices, a localized application service via the avatar server by emulating at least a subset of functionalities provided by the application service, wherein said providing the localized application service includes locally processing, at least partially, a service request from at least one of the end-user devices at the avatar server; and asynchronously communicating with the application service server to complete the service request.

Providing the localized application service can further comprise: receiving, from at least a first end-user device in the service group, the service request at the avatar server, wherein the service request involves a second end-user device in the service group; and processing the service request, at least partially, by communicating a message to the second end-user device on behalf of the first end-user device. Said communicating the message can be in response to determining that the backhaul network channel is unavailable or that the application service server is unreachable. Processing the service request can include identifying the message indicated by, referenced in, or derived from the service request. Asynchronously communicating with the application service server can be in response to determining that the backhaul network channel is available. Providing the localized application service can further comprise: receiving a data conversion request for a media content from one of the end-user devices; and converting the media content using the application service avatar by utilizing a local version of a processing module stored in the avatar server.

In some embodiments, the method can further comprise receiving an update to the local version of the processing module from the application service server when the backhaul network channel is available. Providing the localized application service can further comprise: receiving a content provisioning request including a content identifier from a requesting device among the end-user devices; locating content via the content identifier in a local data bank in the avatar server; and serving the content to the requesting device in response to locating the content in the local data bank.

Providing the localized application service can further comprise: receiving a content provisioning request including a content identifier from a requesting device among the end-user devices; and locating content via the content identifier in a local data bank in the avatar server; and fetching the content from the application service server to deliver to the requesting device, in response to being unable to locate the content in the local data bank when the backhaul network channel is available.

Providing the localized application service can further comprise: receiving a content provisioning request including a content identifier from a requesting device among the end-user devices; and locating content via the content identifier in a local data bank in the avatar server; and queuing a content request for the content to the application service server for subsequent delivery to the requesting device, in response to being unable to locate the content in the local data bank and when the backhaul network channel is unavailable. Providing the localized application service can further comprise: receiving a content publishing request including publishable content from a requesting device among the end-user devices; and pre-publishing the publishable content within the service group by making the publishable content available to the service group prior to sending the publishable content to the application service server.

In some embodiments, one or more computer-readable non-transitory storage media embody software that is operable when executed to perform a method according to any of the disclosed embodiments. In some embodiments, a system comprises: one or more processors; and at least one memory coupled to the processors and comprising instructions executable by the processors, the processors operable when executing the instructions to perform a method according to the disclosed embodiments. In some embodiments, a computer program product, comprising a computer-readable non-transitory storage media or other data storage apparatus, is operable when executed on a data processing system to perform a method according to the disclosed embodiments.

What is claimed is:

1. A method, comprising:
   implementing an application service avatar at an avatar server that has at least an intermittent network access via a backhaul network channel to an application service server for providing an application service to client applications;
   establishing a service group by maintaining a list of one or more end-user devices connected to the avatar server to access the application service;
   providing, to the end-user devices, a localized application service via the avatar server by emulating at least a subset of functionalities provided by the application service, wherein said providing the localized application service includes:
   locally processing, at least partially, a service request from at least one of the end-user devices at the avatar server;
   receiving, from at least a first end-user device in the service group, a content publishing request including publishable content to be published to a sharable public domain; and
   in response to determining that the backhaul network channel is unavailable or that the application service server is unreachable, locally, at the avatar server, pre-publishing the publishable content within the service group by making the publishable content available to the one or more end-user devices in the service group prior to sending the publishable content to the application service server; and when the backhaul network channel is available, asynchronously communicating with the application service server to send the publishable content to the application service server.

2. The method of claim 1, wherein providing the localized application service further comprises:

receiving, from at least a first end-user device in the service group, the service request at the avatar server, wherein the service request involves a second end-user device in the service group; and processing the service request, at least partially, by communicating a message to the second end-user device on behalf of the first end-user device.

3. The method of claim 2, wherein said communicating the message is in response to determining that the backhaul network channel is unavailable or that the application service server is unreachable.

4. The method of claim 2, wherein processing the service request includes identifying the message indicated by, referenced in, or derived from the service request.

5. The method of claim 1, wherein asynchronously communicating with the application service server is in response to determining that the backhaul network channel is available.

6. The method of claim 1, wherein providing the localized application service further comprises:

receiving a data conversion request for a media content from one of the end-user devices; and converting the media content using the application service avatar by utilizing a local version of a processing module stored in the avatar server.

7. The method of claim 6, further comprising receiving an update to the local version of the processing module from the application service server when the backhaul network channel is available.

8. The method of claim 1, wherein providing the localized application service further comprises:

receiving a content provisioning request including a content identifier from a requesting device among the end-user devices; and locating content via the content identifier in a local data bank in the avatar server; and serving the content to the requesting device in response to locating the content in the local data bank.

9. The method of claim 1, wherein providing the localized application service further comprises:

receiving a content provisioning request including a content identifier from a requesting device among the end-user devices; and locating content via the content identifier in a local data bank in the avatar server; and fetching the content from the application service server to deliver to the requesting device, in response to being unable to locate the content in the local data bank when the backhaul network channel is available.

10. The method of claim 1, wherein providing the localized application service further comprises:

receiving a content provisioning request including a content identifier from a requesting device among the end-user devices; and locating content via the content identifier in a local data bank in the avatar server.

11. The method of claim 10, wherein providing the localized application service further comprises queuing a content request for the content to the application service server for subsequent delivery to the requesting device, in response to being unable to locate the content in the local data bank and when the backhaul network channel is unavailable.

12. A non-transitory computer-readable storage memory storing computer-executable instructions that, when executed by a physical processor of a computing device, cause the computing device to perform a method comprising:

implementing an application service avatar at an avatar server that has at least an intermittent network access via a backhaul network channel to an application service server for providing an application service to client applications;

establishing a service group by maintaining a list of one or more end-user devices connected to the avatar server to access the application service;

providing, to the end-user devices, a localized application service via the avatar server by emulating at least a subset of functionalities provided by the application service, wherein said providing the localized application service includes:

locally processing, at least partially, a service request from at least one of the end-user devices at the avatar server;

receiving, from at least a first end-user device in the service group, a content publishing request including publishable content to be published to a sharable public domain; and in response to determining that the backhaul network channel is unavailable or that the application service server is unreachable, locally, at the avatar server, pre-publishing the publishable content within the service group by making the publishable content available to the one or more end-user devices in the service group prior to sending the publishable content to the application service server; and when the backhaul network channel is available, asynchronously communicating with the application service server to send the publishable content to the application service server.

13. The non-transitory computer-readable storage memory of claim 12, wherein providing the localized application service further comprises:

receiving, from at least a first end-user device in the service group, the service request at the avatar server, wherein the service request involves a second end-user device in the service group; and processing the service request, at least partially, by communicating a message to the second end-user device on behalf of the first end-user device.

14. The non-transitory computer-readable storage memory of claim 13, wherein said communicating the message is in response to determining that the backhaul network channel is unavailable or that the application service server is unreachable.

15. The non-transitory computer-readable storage memory of claim 13, wherein processing the service request includes identifying the message indicated by, referenced in, or derived from the service request.

16. The non-transitory computer-readable storage memory of claim 12, wherein asynchronously communicating with the application service server is in response to determining that the backhaul network channel is available.

17. A system comprising:
an implementation module, stored in memory, that implements an application service avatar at an avatar server that has at least an intermittent network access via a backhaul network channel to an application service server for providing an application service to client applications;
an establishment module, stored in memory, that establishes a service group by maintaining a list of one or more end-user devices connected to the avatar server to access the application service; and
a providing module, stored in memory, that provides, to the end-user devices, a localized application service via the avatar server by emulating at least a subset of functionalities provided by the application service, wherein said providing the localized application service includes:
    locally processing, at least partially, a service request from at least one of the end-user devices at the avatar server;
    receiving, from at least a first end-user device in the service group, a content publishing request including publishable content to be published to a sharable public domain; and
    in response to determining that the backhaul network channel is unavailable or that the application service server is unreachable, locally, at the avatar server, pre-publishing the publishable content within the service group by making the publishable content available to the one or more end-user devices in the service group prior to sending the publishable content to the application service server; and
    when the backhaul network channel is available, asynchronously communicating with the application service server to send the publishable content to the application service server.

18. The system of claim 17, wherein providing the localized application service further comprises:
    receiving, from at least a first end-user device in the service group, the service request at the avatar server, wherein the service request involves a second end-user device in the service group; and
    processing the service request, at least partially, by communicating a message to the second end-user device on behalf of the first end-user device.

19. The system of claim 18, wherein said communicating the message is in response to determining that the backhaul network channel is unavailable or that the application service server is unreachable.

20. The system of claim 18, wherein processing the service request includes identifying the message indicated by, referenced in, or derived from the service request.

* * * * *